United States Patent [19]
Heidecker

[11] 3,810,067
[45] May 7, 1974

[54] ELECTRICAL SIGNAL FILTER

[75] Inventor: Robert F. Heidecker, Longmont, Colo.

[73] Assignee: Iomec, Inc., Santa Clara, Calif.

[22] Filed: May 23, 1973

[21] Appl. No.: 362,968

[52] U.S. Cl. .................. 328/164, 328/158, 328/167
[51] Int. Cl. .................. H03k 5/01
[58] Field of Search ............ 328/167, 165, 160, 55, 328/158

[56] References Cited

UNITED STATES PATENTS

| | | | |
|---|---|---|---|
| 3,304,508 | 2/1967 | Danielson et al. | 328/164 |
| 3,522,545 | 8/1970 | Wood | 328/165 |
| 3,614,636 | 10/1971 | Wendland | 328/160 X |
| 3,622,894 | 11/1971 | Heidecker | 328/165 X |
| 3,663,883 | 5/1972 | Ulso | 328/164 X |

*Primary Examiner*—John S. Heyman
*Attorney, Agent, or Firm*—Townsend and Townsend

[57] ABSTRACT

A filtering technique for removing noise and enhancing the waveform shape of an information signal train. An incoming signal is subjected to a two bit interval delay. The delayed signal is separately summed with and multiplied by the undelayed signal. The resulting sum and product signals are multiplied together and the resulting product signal is summed with the incoming signal delayed by one bit interval. The resulting sum is passed through a low pass filter and used to drive a limit amplifier to produce the filtered output signal.

10 Claims, 2 Drawing Figures

ELECTRICAL SIGNAL FILTER

BACKGROUND OF THE INVENTION

1. Field of the Invention

This invention relates to electrical filter devices for improving the form of an electrical signal train. More particularly, this invention relates to an electrical signal filter for removing noise and for enhancing the shape of a train of information signals in order to permit the information content of the signal train to be recovered with an extremely low data error rate.

2. Description of the Prior Art

Many information encoding schemes are known which are capable of conveying information of a binary nature between various types of information utilization devices. Such schemes are used, for example, to encode information collected at a remote station, such as an electronic cash register, into a form suitable for efficient transmission to a central computer where the received data may be processed. In some applications, new data is transmitted back to the same or a different remote station.

The success of such information encoding schemes is totally dependent upon the ability of the receiving station to correctly interpret the received information. However, all known methods of transmission of information encoded in an electrical signal train, whether by transmission along electronically conductive transmission links or by propogation of electromagnetic waves through a medium such as the earth's atmosphere, cause distortions of the electrical signal train. Unless some compensation is made for these distortions, the received information may be masked by the distortions to such a degree that the information is partially or totally unrecognizable.

Many filtering schemes have been devised for minimizing the adverse effects of such signal train distortions. Some filters have been designed for use at the transmitting end; others have been designed for use at the receiving end. Still other filtering schemes have been devised using matched filters at both ends of an information transmission system. Such known filtering arrangements have met with varying degrees of success. In general, the more efficient the filter, the more complicated and costly it has been to construct.

SUMMARY OF THE INVENTION

The invention disclosed herein comprises a filtering technique for eliminating that type of signal train distortion commonly referred to as electrical noise, and for enhancing the shape of the information signal train to permit interpretation of the information contained therein with an extremely low data error rate. In the preferred embodiment, an information signal train containing binary information in a succession of equally-spaced binary digit intervals is subjected to a two interval delay. The delay signal is separately summed with and multiplied by the incoming undelayed signal. The resulting sum and product signals are in turn multiplied together and this product signal is summed with the incoming signal delayed by one digit interval. This resulting sum is passed through a low pass filter and used to drive a limit amplifier to produce the output signal.

For a fuller understanding of the nature and advantages of the invention, reference may be had to the following detailed description taken in conjunction with the accompanying drawings.

DESCRIPTION OF THE PREFERRED EMBODIMENT

Figure 1:
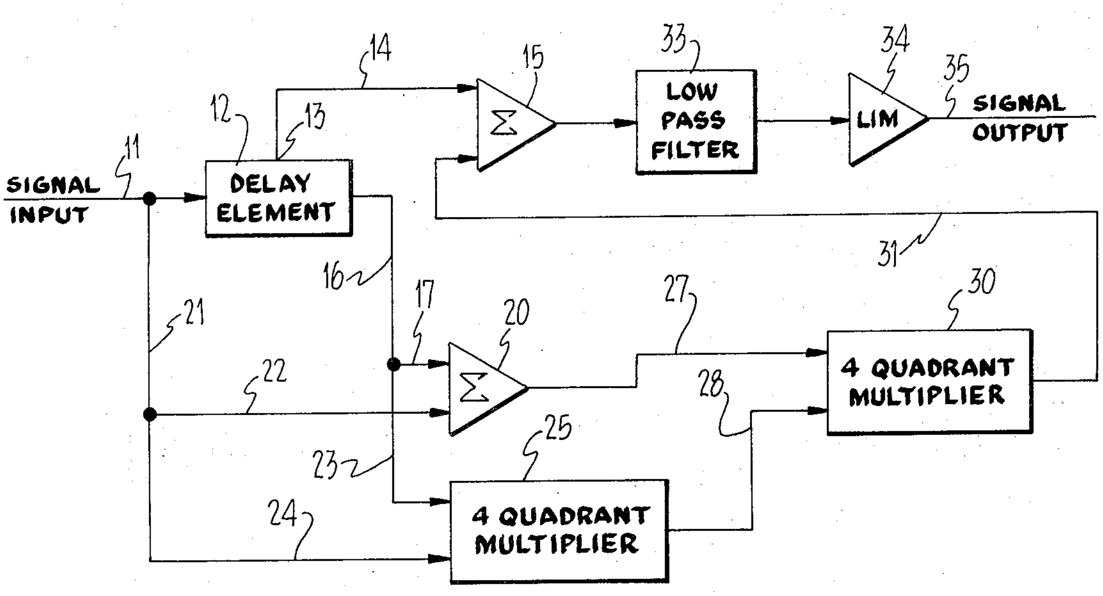
FIG. 1 is a block diagram of a filter constructed according to the invention.

Turning now to the drawings, FIG. 1 illustrates an electrical signal filter constructed according to the invention. An incoming information signal train is coupled via lead 11 to the input of delay element 12. Delay element 12 provides a total delay of two binary digit intervals to the incoming signal. The actual value of the delay provided by element 12 is dependent upon the value of a binary digit interval in the information signal train. As will be apparent to those skilled in the art, once the values of the digit interval is known the delay interval provided by delay element 12 may be selected accordingly. Delay element 12 may be implemented in any one of a number of known ways, such as by means of an accoustic delay line or a magnetic delay line. In the preferred embodiment, delay element 12 comprises an R-L-C delay line.

Delay element 12 is provided with a tap 13 for furnishing the incoming signal delayed by one digit interval to a first input of a linear summing amplifier 15 for a purpose to be described.

The output of delay element 12 present on lead 16 comprises the incoming signal delayed by two digit intervals. This signal is coupled via leads 16, 17 to a first input of a linear summing amplifier 20. The remaining input to linear summing amplifier 20 is the undelayed incoming signal applied via leads 21, 22. Linear summing amplifier 20 functions to form the algebraic sum of the two signals present at the inputs thereto. Linear summing amplifier 20 as well as linear summing amplifier 15 may be implemented by any one of several known summing amplifiers which are substantially linear over the desired range of signal inputs.

The two bit interval delayed signal present on output lead 16 of delay element 12 is also coupled via lead 23 to a first input of a four-quadrant multiplier 25. The remaining input to four-quadrant multiplier 25 comprises the undelayed incoming signal applied via leads 21, 24. Four-quadrant multiplier 25 functions to perform a signed multiplication of the two signals present at the inputs thereto. Four-quadrant multiplier 25 may be implemented by means of several circuits known to those skilled in the art. In the preferred embodiment an RCA type CA 3060 integrated circuit as described on pages 191–193 of the RCA "Linear Integrated Circuits Handbook," Technical Series IC-42 was used with excellent results.

The output of summing amplifier 20 is applied via lead 27 to a first input of a second four-quadrant multiplier 30. The remaining input of four-quadrant multiplier 30 is the output of four-quadrant multiplier 25. Four-quadrant multiplier 30 functions to perform a signed multiplication of the two signals present at the inputs thereto. Four-quadrant multiplier 30 may be implemented in the same manner as four-quadrant multiplier 25, with the major distinction between these two circuit elements being that multiplier 30 must be fully linear over the expected range of signal inputs while multiplier 25 need not be so.

The output of four-quadrant multiplier 30 is applied via lead 31 to the remaining input of linear summing amplifier 15. The output of linear summing amplifier 15 is applied to the input of a low pass filter 33. In the preferred embodiment low pass filter 33 has a cut-off frequency of 1.4 times the data frequency, i.e., 1.4 divided by *t*, where t is the period of the standard data bit interval. The output of low pass filter 33 is coupled to a standard limit amplifier 34 which provides a square wave saturated output signal on lead 35.

In operation, an incoming signal is delayed by two digit intervals and summed with later-following portions of the input signal by linear summing amplifier 20. The delayed incoming signal is contemporaneously multiplied with later-following portions of the incoming signal by four-quadrant multiplier 25. The summed and multiplied signals are in turn multiplied by four-quadrant linear multiplier 30. The resulting product signal is then summed with the incoming signal delayed by one digit interval in linear summing amplifier 15. The resulting sum is filtered by low pass filter 33 which removes high frequency, unwanted signal portions. The filtered signal is used to drive limit amplifier 34 to produce a squared-up output signal which is suitable for driving a transmission line, for subsequent demodulation, and the like.

Figure 2:
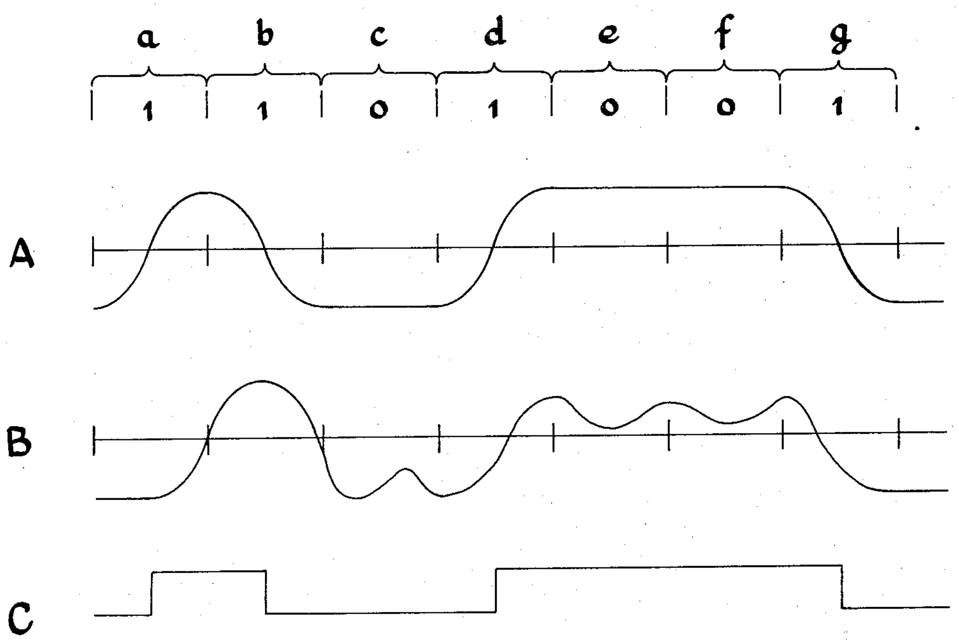
FIG. 2 is a waveform diagram illustrating the operation of the filter of FIG. 1.

The filter of FIG. 1 has been found particularly effective for removing noise and distortions from signal trains of the type shown in FIG. 2. In this figure, waveform A represents an idealized signal train containing the binary digit word 1101001. Signal train A comprises seven binary digit intervals *a–g* of uniform duration. A "one" digit is distinguished by a transition of the signal through the zero level at substantially the mid-point of the digit interval, as in digit intervals *a*, *b*, *d* and *g*. A "zero" digit is designated by the absence of a zero crossing in a given digit interval, as in digit intervals *c*, *e* and *f*.

Waveform B illustrates a typical degraded signal train containing the same digital information as idealized waveform A. In waveform B the two zero crossing transitions in digit intervals *a,b* both occur near the end of their respective intervals, while the zero crossing transitions in digit interval d occurs somewhat beyond the midpoint of this digit interval. The zero crossing transition in digit interval g occurs somewhat before the midpoint of the digit interval. Those portions of the signal train representing the digit intervals containing zeros — viz. digit intervals *c*, *e* and *f* — each exhibit an irregular variable amplitude rather than a constant amplitude.

If this degraded signal were applied directly to the input of limit amplifier 34, there is a high probability that this element would provide a digital output signal train which incorrectly identifies the binary data word. When a degraded signal train of the type illustrated by waveform B is passed through the filter of FIG. 1, however, the waveform is substantially improved to closely approximate idealized waveform A. When this improved waveform is applied to the input of limit amplifier 34, the output signal on terminal 35 comprises the signal train illustrated as waveform C. It is noted that this waveform correctly identifies the one bits of the binary data word as sharp transitions and the zero bits of the binary data word as the absence of any transition during a given digit interval.

Signal filters constructed according to the above-described invention have been found to minimize the data error rate in information handling systems to which such filters have been applied. While the above provides a full and complete disclosure of the preferred embodiment of the invention, various modifications, alternate constructions, and equivalents may be employed without departing from the true spirit and scope of the invention. It is understood that other information encoding schemes than that illustrated in FIG. 2 may be utilized in conjunction with filters constructed according to the invention for improving the data recovery rate. Therefore, the above description and illustrations should not be construed as limiting the scope of the invention which is solely defined by the appended claims.

What is claimed is:

1. A method of filtering an information signal train having information contained in digit intervals to reduce the data error rate, said method comprising:

a. delaying said information signal train by a time interval equivalent to two digit intervals;
b. summing the delayed signal train with the received information signal train;
c. multiplying the delayed signal train by the received information signal train;
d. multiplying the signals resulting from steps (b) and (c);
e. delaying the information signal train by a time interval equivalent to one digit interval; and
f. summing the signals resulting from step (d) with the information signal train delayed by one digit interval.

2. The method of claim 1 further including the step of passing the signals resulting from step (f) through a low pass filter.

3. The method of claim 1 further including the step of fitering the signals resulting from step (f) with a low pass filter to reject all signals having a frequency higher than about 1.4/*t*, where t is the duration of the information signal train digit interval.

4. A signal filter for improving a degraded information signal train containing information in digit intervals, said filter comprising:

an input terminal adapted to be coupled to said signal train;

a delay element coupled to said input terminal and having a first output for providing a signal train delayed by one digit interval and a second output for providing a signal train delayed by two digit intervals;

first summing means coupled to said second output of said delay element and said input terminal for providing a signal representative of the algebraic sum of said information signal train and the signal train delayed by two digit intervals;

first multiplier means coupled to said second output of said delay element and said input terminal for providing a signal representative of the signed product of said information signal train and the signal train delayed by two digit intervals;

second multiplier means coupled to said first summing means and said first multiplier means for providing a signal representative of the signed product of the output signal from said first summing means and said first multiplier means; and second summing means coupled to said second multiplier means and said first output of said delay element for providing a signal representative of the algebraic sum of said signed product signal from said second multiplier means and said signal train delayed by one digit interval.

5. The apparatus of claim 4 wherein said first and second summing means each comprises a linear summing amplifier.

6. The apparatus of claim 4 wherein said second multiplier means comprises a linear four-quadrant multiplier.

7. The apparatus of claim 4 wherein said first and second multiplier means each comprises a linear four-quadrant multiplier.

8. The apparatus of claim 4 further including a low pass filter coupled to the output of said second summing means.

9. The apparatus of claim 8 wherein said low pass filter has an upper cut-off frequency of $1.4/t$, where t is the period of said digit interval.

10. The apparatus of claim 4 further including a limit amplifier coupled to the output of said second summing means.

* * * * *